United States Patent
Chen et al.

(10) Patent No.: US 8,799,601 B1
(45) Date of Patent: Aug. 5, 2014

(54) TECHNIQUES FOR MANAGING DEDUPLICATION BASED ON RECENTLY WRITTEN EXTENTS

(75) Inventors: Xiangping Chen, Shrewsbury, MA (US); Philippe Armangau, Acton, MA (US)

(73) Assignee: EMC Corporation, Hopkinton, MA (US)

( * ) Notice: Subject to any disclaimer, the term of this patent is extended or adjusted under 35 U.S.C. 154(b) by 209 days.

(21) Appl. No.: 13/536,375

(22) Filed: Jun. 28, 2012

(51) Int. Cl.
*G06F 12/00* (2006.01)
*G06F 12/16* (2006.01)

(52) U.S. Cl.
USPC ............ 711/162; 711/161; 711/163; 711/167

(58) Field of Classification Search
CPC ............ G06F 11/1456; G06F 11/2074; G06F 11/2071; G06F 11/1451; G06F 11/2082
USPC .................. 711/162, 161, 163, 167
See application file for complete search history.

(56) References Cited

U.S. PATENT DOCUMENTS

| | | |
|---|---|---|
| 7,631,155 B1 | 12/2009 | Bono et al. |
| 7,694,191 B1 | 4/2010 | Bono et al. |
| 7,818,535 B1 | 10/2010 | Bono et al. |
| 8,037,345 B1 | 10/2011 | Iyer et al. |
| 8,140,821 B1 | 3/2012 | Raizen et al. |
| 8,156,306 B1 | 4/2012 | Raizen et al. |
| 8,285,758 B1 | 10/2012 | Bono et al. |
| 8,332,612 B1 | 12/2012 | Raizen et al. |
| 8,407,265 B1 | 3/2013 | Scheer et al. |
| 8,442,952 B1 | 5/2013 | Armangau et al. |
| 8,538,933 B1 | 9/2013 | Hu et al. |
| 8,539,148 B1 | 9/2013 | Chen et al. |
| 8,566,371 B1 | 10/2013 | Bono et al. |
| 2009/0265399 A1* | 10/2009 | Cannon et al. ................ 707/205 |
| 2013/0166862 A1 | 6/2013 | Huang |

* cited by examiner

*Primary Examiner* — Yong Choe
(74) *Attorney, Agent, or Firm* — BainwoodHuang

(57) ABSTRACT

A technique is directed to managing deduplication of extents in a data storage apparatus having processing circuitry and memory which stores the extents (e.g., blocks). The technique involves constructing, by the processing circuitry, a recently written extent list which identifies recently written extents stored within the memory. The technique further involves referencing the recently written extent list to bypass (or skip over) extents identified by the recently written extent list when obtaining a candidate extent for possible deduplication. The technique further involves processing the candidate extent for possible deduplication. Here, by identifying frequently overwritten extents on the recently written extent list, the data storage apparatus is able to easily avoid cycles of deduplicating and subsequently splitting frequently overwritten extents.

21 Claims, 10 Drawing Sheets

| LOGICAL EXTENT ID (E.G., LBA) 150 | TIME STAMP OF LAST WRITE 152 | TIMES WRITTEN SINCE LAST UPDATE 154 | OTHER DATA (E.G., FILE ID, ETC.) 156 |
|---|---|---|---|
| LBA_Q | 15:38:42 | 4 | ⋮ |
| LBA_Z | 15:38:45 | 1 | ⋮ |
| LBA_G | 15:39:01 | 3 | ⋮ |
| LBA_H | 15:39:02 | 3 | ⋮ |
| LBA_I | 15:39:32 | 3 | ⋮ |
| LBA_P | 15:40:01 | 6 | ⋮ |
| LBA_C | 15:40:23 | 4 | ⋮ |
| LBA_U | 15:40:32 | 8 | ⋮ |
| ... | ... | ... | ... |

FIG. 4

| LOCK TYPE 250 | LU ID/FILE ID 252 | TIME STAMP 254 | RANGE FIELDS 256 | |
|---|---|---|---|---|
| | | | STARTING OFFSET 258 | RANGE LENGTH 260 |
| READ | 1015 | 15:38:42 | 8 | 128 |
| WRITE | 1017 | 15:38:45 | 26 | 27 |
| READ | 1002 | 15:39:01 | 238 | 113 |
| READ | 1002 | 15:39:02 | 215 | 88 |
| WRITE | 1017 | 15:42:32 | 28 | 10 |
| WRITE | 998 | 15:44:01 | 30 | 16 |
| READ | 998 | 16:08:23 | 32 | 45 |
| READ | 1028 | 18:21:32 | 18 | 26 |
| ... | ... | ... | ... | ... |

FIG. 8

TECHNIQUES FOR MANAGING DEDUPLICATION BASED ON RECENTLY WRITTEN EXTENTS

BACKGROUND

Block deduplication is the process of (i) finding block mappings that map to separate instances of identical data, and (ii) updating those block mappings to refer to a single instance of that data. Using block deduplication, data storage systems are able to eliminate storage of redundant copies of host data.

One conventional approach to performing block deduplication in a data storage system involves closely evaluating each block of host data stored by the data storage system for possible deduplication. In particular, the data storage system applies a hash algorithm to each block of host data stored by the data storage system. After the data storage system computes a hash result from a particular block of host data, the data storage system compares that hash result to a database of stored hash results previously computed from other blocks of host data. If the data storage system finds a matching hash result in the database, the data storage system performs a bit-by-bit comparison to determine whether the blocks of host data are identical. If so, the data storage system shares a single instance of the block of host data among block mappings. Otherwise, the data storage system adds a new record to the database, i.e., the data storage system adds the hash result computed from the particular block of host data to the database for possible matching in the future.

When a host modifies a block of host data that has been deduplicated, the data storage system splits that shared block of host data into separate instances. Along these lines, suppose that a data storage system maintains a first block mapping and a second block mapping to a single instance of host data. Further suppose that a host issues an IO command to modify the block of host data as referenced by the second block mapping, while the first block mapping is intended to continue to reference the original block of host data. The data storage system responds by maintaining the original instance of the host data on behalf of the first block mapping, and creating a new instance which includes the modification on behalf of the second block mapping.

SUMMARY

Unfortunately, there are deficiencies to the above-described conventional approach to performing block deduplication which involves methodically evaluating each block of host data stored by the data storage system for possible deduplication. For example, a host may frequently overwrite certain blocks with new data. In such a situation, deduplication of frequently overwritten blocks may result in cycles of hash result computation, instance sharing and instance splitting, i.e., inefficient use of deduplication processing.

Additionally, as these blocks get overwritten and reconsidered for deduplication, the data storage system tends to add new records to the database of previously computed hash results. That is, the data storage system adds new records which refer to the same physical block location thus filling the database of previously computed hash results with stale records. Accordingly, the database becomes unnecessarily large in size thus consuming excess memory as well as increasing the amount of time needed to complete database searches.

Furthermore, even if deduplication is performed in the background on the data storage system (i.e., during idle system time), consumption of resources for deduplication iterations of frequently overwritten blocks takes away resources that otherwise could be devoted to other services. For example, another background process which is configured to remove stale records from the database of previously computed hash results may be prevented from running as often.

In contrast to the above-described conventional approach to performing block deduplication which may inefficiently deduplicate frequently overwritten blocks, an improved technique is directed to managing deduplication based on recently written extents. Such operation enables a data storage system to avoid evaluation of frequently overwritten extents and thus save processing and memory resources involved in hash computation, comprehensive block comparisons, and so on. Additionally, such operation provides for a smaller extent sharing index table used for deduplication since the technique is able to eliminate adding table entries corresponding to recently written extents. Furthermore, such operation enables quick cleanup of the extent sharing index table by simply deleting any table entries corresponding to recently written extents. Accordingly, the technique enjoys lower memory consumption by the extent sharing index table as well as quicker table searching.

One embodiment is directed to a method of managing deduplication of extents which is performed in a data storage apparatus having processing circuitry and memory which stores the extents (e.g., blocks). The method includes constructing, by the processing circuitry, a recently written extent list which identifies recently written extents stored within the memory. The method further includes referencing the recently written extent list to bypass (or skip over) extents identified by the recently written extent list when obtaining a candidate extent for possible deduplication. The method further includes processing the candidate extent for possible deduplication. Here, by identifying frequently overwritten extents on the recently written extent list, the data storage apparatus is able to easily avoid deduplicating and then splitting frequently overwritten extents.

In some arrangements, the data storage apparatus maintains an extent sharing index table having entries which (i) have existing hash values and (ii) identify extents. In these arrangements, processing the candidate extent for possible deduplication includes digesting the candidate extent to produce a current hash value, and searching the extent sharing index table for an existing entry having an existing hash value which matches the current hash value. Processing the candidate extent for possible deduplication further includes, when an existing entry in the extent sharing index table is found to have an existing hash value which matches the current hash value:

(i) searching the recently written extent list to confirm that an existing extent, which is identified by the existing entry, is not identified by the recently written extent list, (ii) when the existing extent is not identified by the recently written extent list, performing a comprehensive compare operation to determine whether to deduplicate the candidate extent with the existing extent, and (iii) when the existing extent is identified by the recently written extent list, adding a new entry to the extent sharing index table, the new entry having the current hash value and identifying the candidate extent.

Additionally, processing the candidate extent for possible deduplication further includes, when no existing entry in the extent sharing index table is found to have an existing hash value which matches the current hash value, adding a new entry to the extent sharing index table, the new entry having the current hash value and identifying the candidate extent. Here, if it is discovered that one of the extents has been recently modified, the data storage apparatus is able to avoid performing a comprehensive compare operation between the candidate extent and the existing extent (normally performed to determine whether the extents are identical) and thus preventing deduplication iterations of frequently written extents and conserving resources.

In some arrangements, the method further includes performing a cleanup operation to reduce the size of the extent sharing index table based on the recently written extent list. In particular, the data storage apparatus deletes, from the extent sharing index table, existing entries which identify extents identified by the recently written extent list. Such operation reduces the amount of memory consumed by the extent sharing index table and improves table searching efficiency.

Other embodiments are directed to systems, apparatus, processing circuits, computer program products, and so on. Some embodiments are directed to various methods, devices, electronic components and circuitry which are involved in managing deduplication of extents based on recently written extents.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 4 is a block diagram of a list of recently written extents which is utilized by the data storage apparatus of FIG. 2.

FIG. 8 is a block diagram of a portion of a lock history database which is managed by the data storage apparatus of FIG. 2.

DETAILED DESCRIPTION

Overview

Improved techniques are directed to managing deduplication based on recently written extents. Such operation permits a data storage system to avoid evaluation of frequently overwritten extents thereby saving processing and memory resources involved in hash computation, comprehensive block comparisons, etc. Additionally, such operation provides for a smaller extent sharing index table used for deduplication since the techniques are able to eliminate adding table entries corresponding to recently written extents. Furthermore, such operation enables quick cleanup of the extent sharing index table by simply deleting any index table entries corresponding to recently written extents. As a result, the techniques enjoy lower memory consumption by the extent sharing index table as well as quicker searching of the extent sharing index table.

Figure 1:
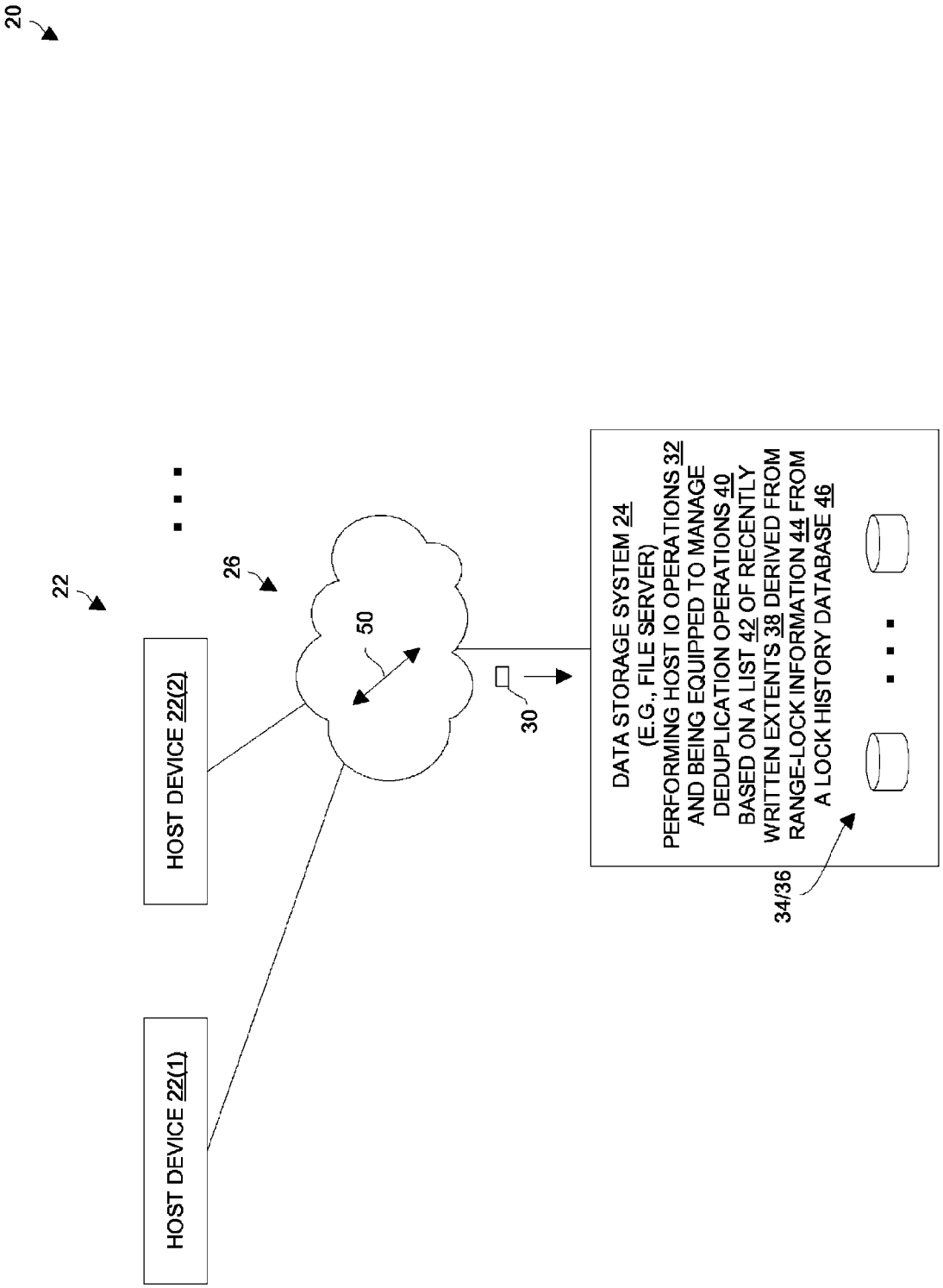
FIG. 1 is a block diagram of an electronic environment which includes a data storage apparatus equipped to manage deduplication operations based on recently written extents.

FIG. 1 shows a data storage environment 20 which is equipped with deduplication management based on recently written extents. The data storage environment 20 includes host devices 22(1), 22(2), . . . (collectively, host devices 22), a data storage system 24, and a communications medium 26.

The host devices 22 are constructed and arranged to store host data into and load host data from the data storage system 24. Along these lines, each host device 22 provides host IOs 30 (e.g., read commands to read host data, write commands to write host data, etc.) to the data storage system 24 for processing.

The data storage system 24 is constructed and arranged to process the host IOs 30 from the host devices 22 by performing host TO operations 32 (e.g., read IOs, write IOs, etc. in response to the host IOs 30) on a set of LUNs 34. Each LUN 34 is partitioned into 1 GB slices 36, and each 1 GB slice 36 is partitioned into extents 38 (e.g., 8 KB data blocks). Such extents 38 are addressable (e.g., via logical block addressing or LBAs) and are mappable (e.g., to file system block numbers or FSBNs).

Additionally, the data storage system 24 is constructed and arranged to manage deduplication operations 40 based on a list 42 of recently written extents 38. Such deduplication operations 40 include, among others, digest operations to generate hash values of extents 38, sharing operations to share identical extents 38, and cleanup operations to efficiently maintain an indexing table used by many of the deduplication operations 40. As will be explained in further detail below, the data storage system 24 is able to identify recently written extents 38 from range-lock information 44 stored in a lock history database 46 and manage the deduplication operations 40 based on such range-lock information 44.

The communications medium 26 connects the various components of the data storage environment 20 together to enable these components to exchange electronic signals 50 (e.g., see the double arrow 50). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, SAN-based communications, or combinations thereof.

During operation, the data storage system 24 receives host IOs 30 from the host devices 22. In order to maintain data consistency, the data storage system 24 imposes locks on the extents 38 when processing the host IOs 30. For example, the data storage system 24 applies read (or shared) locks on ranges of extents 38 when the host devices 22 read host data from these ranges of extents 38. Furthermore, the data storage system 24 applies write (or exclusive) locks on ranges of extents 38 when the host devices 22 write host data to these ranges of extents 38.

As the data storage system 24 imposes range locks on the ranges of extents 38, the data storage system 24 updates the range-lock information 44 in the lock history database 46 based on these range locks. Accordingly, the data storage system 24 is then able to identify which extents 38 have been recently written based on the range-lock information 44. In particular, the data storage system 24 constructs a list 42 of the recently written extents 38, and then efficiently manages deduplication operations 40 based on the list 42. For example, based on the list 42, the data storage system 24 avoids evaluating recently written extents 38 for deduplication. Additionally, based on the list 42, the data storage system 24 quickly cleans up an indexing table used for deduplication thus reducing memory consumed by the indexing table and improving table searching performance. Further details will now be provided with reference to FIG. 2.

Figure 2:
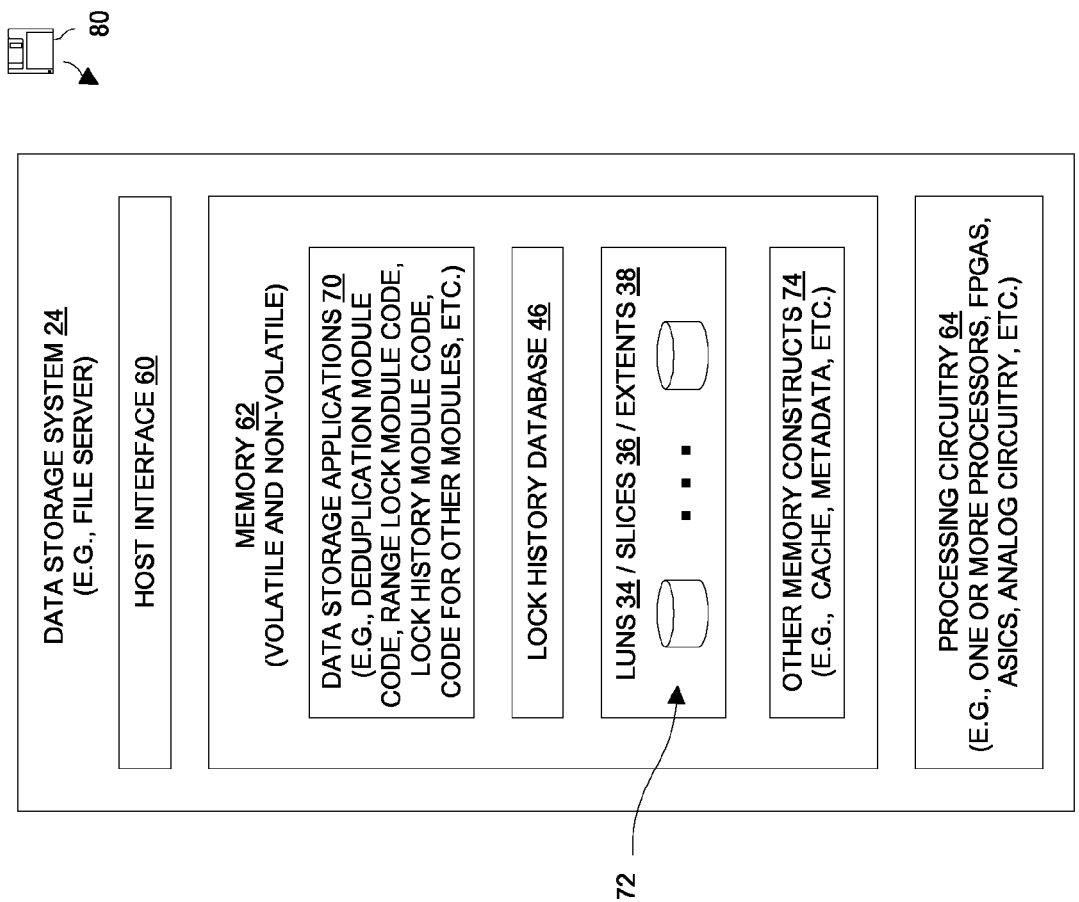
FIG. 2 is a block diagram of the data storage apparatus of FIG. 1.

FIG. 2 shows particular details of the data storage system 24 of the data storage environment 20 (also see FIG. 1). As shown in FIG. 2, the data storage system 24 includes a host interface 60, memory 62, and processing circuitry 64 among other things. The memory 62 includes a set of data storage applications 70, the lock history database 46, storage 72 for the above-mentioned LUNs 34, slices 36 and extents 38, as well as other memory constructs 74.

The host interface 60 is constructed and arranged to connect the data storage system 24 to the communications medium 26. Accordingly, the host interface 60 enables the data storage system 24 to communicate with the other components of the data storage environment 20 such as the host devices 22 (FIG. 1).

The memory 62 is intended to represent both volatile memory (e.g., DRAM, SRAM, etc.) and non-volatile memory (e.g., flash storage units, magnetic disk drives, etc.). The data storage applications 70 represent the operating system, drivers, utilities and tools, user-level applications, GUIs, and so on. The storage 72 represents memory which contains the host data. The other memory constructs 74 include additional memory-based items such as a buffer cache, metadata for locks, metadata for deduplication operations (e.g., the indexing table, the list 42 of recently written extents 38, etc.), and so on.

In some arrangements, the storage 72 is tiered based on access speed. For example, the storage may include a first tier of flash memory, a second tier of SAS memory, and a third tier of near line SAS memory.

The processing circuitry 64 is constructed and arranged to perform load and store operations (i.e., to process host IOs 30) on behalf of the host devices 22 (FIG. 1). Additionally, the processing circuitry 64 is constructed and arranged to control updating of the lock history database 46, generate a list 42 of recently written extents 38 based on the lock history database 46, and manage deduplication operations 40 based on the list 42 (also see FIG. 1).

It should be understood that the processing circuitry 64 can be implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product 80 is capable of delivering all or portions of the software to the data storage system 24. The computer program product 80 has a non-transitory (or non-volatile) computer readable medium which stores a set of instructions which controls one or more operations of the data storage system 24. Examples of suitable computer readable storage media include tangible articles of manufacture and apparatus which store instructions in a non-volatile manner such as CD-ROM, flash memory, disk memory, tape memory, and the like.

During operation, the data storage system 24 performs host IO operations 32 in response to the host IOs 30 received from the host devices 22 (FIG. 1). As the data storage system 24 imposes locks on ranges of extents 38 prior to accessing the ranges of extents 38, the data storage system 24 updates range-lock information 44 in the lock history database 46 based on the ranges of extents 38 which were locked by the host IO operations 32.

With the range-lock information 44 of the lock history database 46 now available for analysis, these contents of the lock history database 46 are able to identify particular extents 38 which are active and inactive and, in particular, which extents 38 have been recently written. As a result, the data storage system 24 is able to effectively manage the deduplication process by eliminating evaluation of recently written extents 38 and thus improve deduplication performance. Further details will now be provided with reference to FIG. 3.

Figure 3:
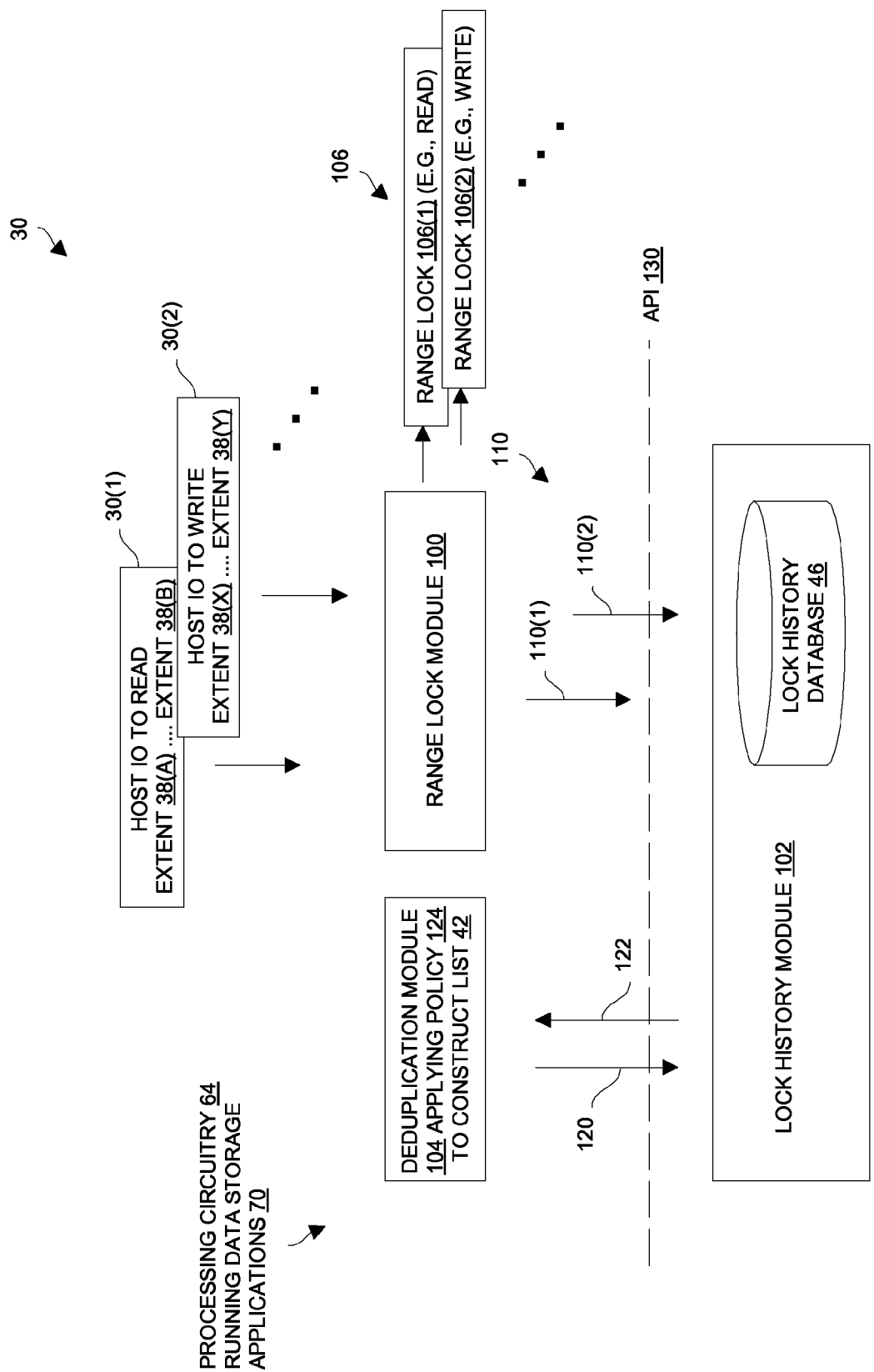
FIG. 3 is a block diagram of particular details of the data storage apparatus of FIG. 2.

FIG. 3 shows particular components of the data storage system 24 which are formed by the processing circuitry 64 when the processing circuitry 64 operates in accordance with the data storage applications 70 (also see FIG. 2). In particular, when the processing circuitry 64 executes code for a range lock module, the processing circuitry 64 forms a range lock module 100. Additionally, when the processing circuitry 64 executes code for a lock history module, the processing circuitry 64 forms a lock history module 102. Furthermore, when the processing circuitry 64 executes code for a deduplication module, the processing circuitry 64 forms a deduplication module 104. Likewise, the processing circuitry 64 is capable of executing other service module code (see applications 70 in FIG. 2), to form service modules as well.

The range lock module 100 is constructed and arranged to impose range locks 106 on ranges of extents 38 as the data storage system 24 performs the host IO operations 32, and thus preserve data coherency and consistency. By way of example, the range lock module 100 is shown as responding to a host IO 30(1) to read host data from extents 38(A), . . . , 38(B) by providing, as part of that host IO operation 32, a read lock 106(1) (i.e., a shared lock) on extents 38(A), . . . , 38(B). Additionally, the range lock module 100 is shown as responding to another host IO 30(2) to write host data to extents 38(X), . . . , 38(Y) by providing, as part of that host IO operation 32, a write lock 106(2) (i.e., an exclusive lock) on extents 38(X), . . . , 38(Y).

The lock history module 102 is constructed and arranged to manage the lock history database 46 holding the range-lock information 44 (also see FIG. 1). In particular, the lock history module 102 receives IO event messages 110 from the range lock module 100 which informs the lock history module 102 of the range locks 106 imposed by the range lock module 100. For example, when the range lock module 100 imposes the read lock 106(1) on extents 38(A), . . . , 38(B), the range lock module 100 provides an IO event message 110(1) informing the range lock module 100 that a read lock 106(1) was imposed on the range of extents 38(A), . . . , 38(B), and the lock history module 102 responds by adding an appropriate entry into the lock history database 46. Likewise, when the range lock module 100 imposes the write lock 106(2) on extents 38(X), . . . , 38(Y), the range lock module 100 provides an IO event message 110(2) informing the range lock module 100 that a write lock 106(2) was imposed on the range of extents 38(X), . . . , 38(Y), and the lock history module 102 responds by adding another appropriate entry into the lock history database 46.

As further shown by FIG. 3, the deduplication module 104 is able to communicate with the lock history module 102. In particular, the deduplication module 104 sends a request signal 120 to the lock history module 102 to obtain the contents of the lock history database 46. In response to the request signal 120, the lock history module 102 provides a response signal 122 containing the contents of the lock history database 46 thus enabling the deduplication module 104 to operate based on the contents.

Once the range-lock information 44 is obtained by the deduplication module 104, the deduplication module 104, is able to construct the list 42 of recently written extents 38. In some arrangements, the deduplication module 104 applies a policy 124 to determine which extents 38 appear on the list 42. For example, the policy 124 may require that the extent 38 have been modified within a predefined amount of time such as six hours, one hour, 15 minutes, and so on. As another example, the policy 124 may require that the extent 38 have been written a predefined number of times within the last time period such as six times within the last six hours, three times within the last hour, once within the last 15 minutes, and so on. Other policies 124 are suitable for use as well.

In some arrangements, the range lock module 100 and the deduplication module 104 communicate with the lock history module 102 through an application programming interface (API) 130. That is, each module 100, 104 is able to call a predefined routine or issue a predefined instruction to the lock history module 102. Similarly, the lock history module 102 is able to call a predefined routine or issue a predefined instruction to the other modules 100, 104. Further details will now be provided with reference to FIGS. 4 through 7.

Deduplication Module

Figure 5:
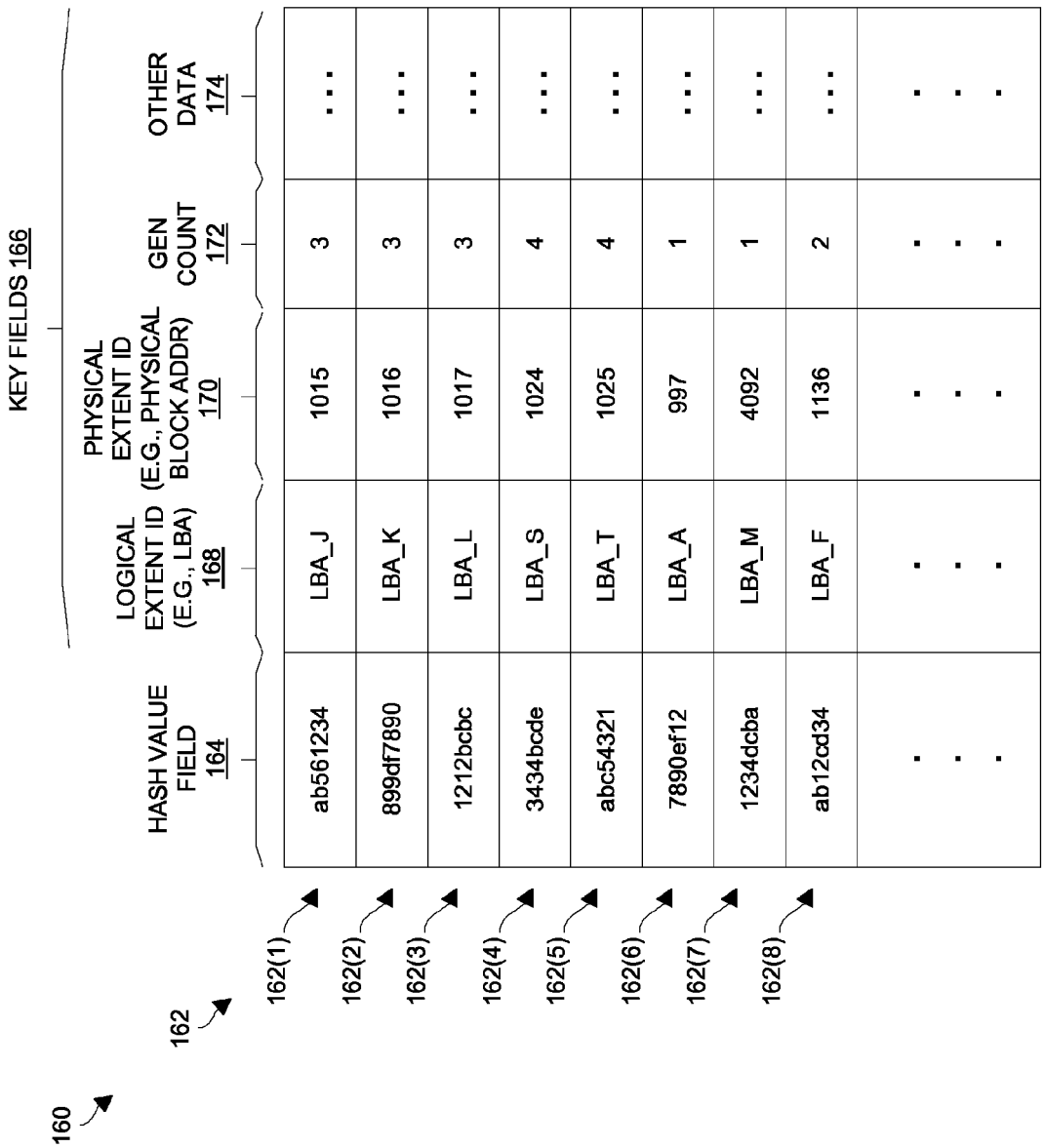
FIG. 5 is a block diagram of an extent sharing index table which is utilized by the data storage apparatus of FIG. 2.
Figure 6:
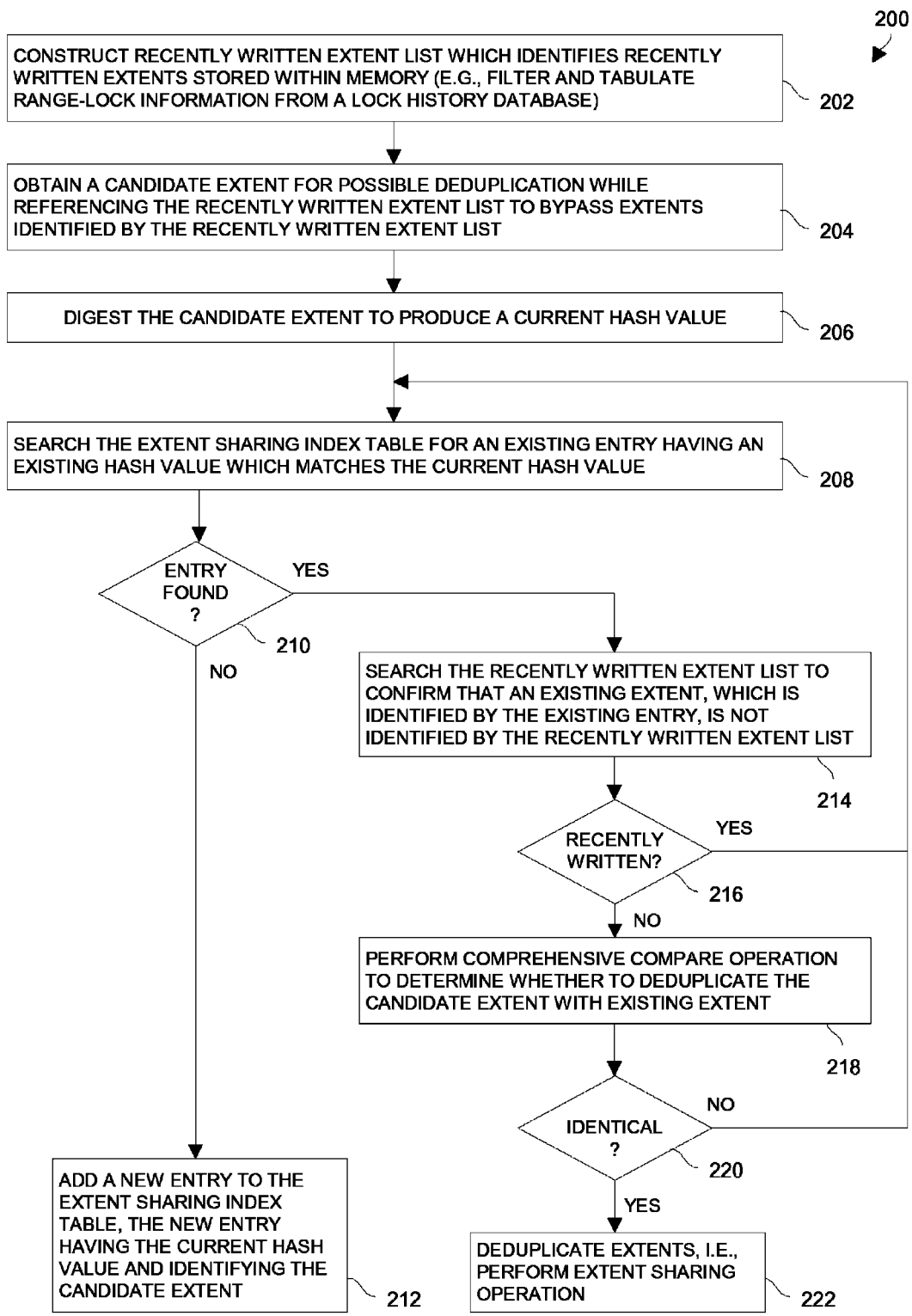
FIG. 6 is a flowchart of a procedure for a deduplication process which is performed by the data storage apparatus of FIG. 2.
Figure 7:
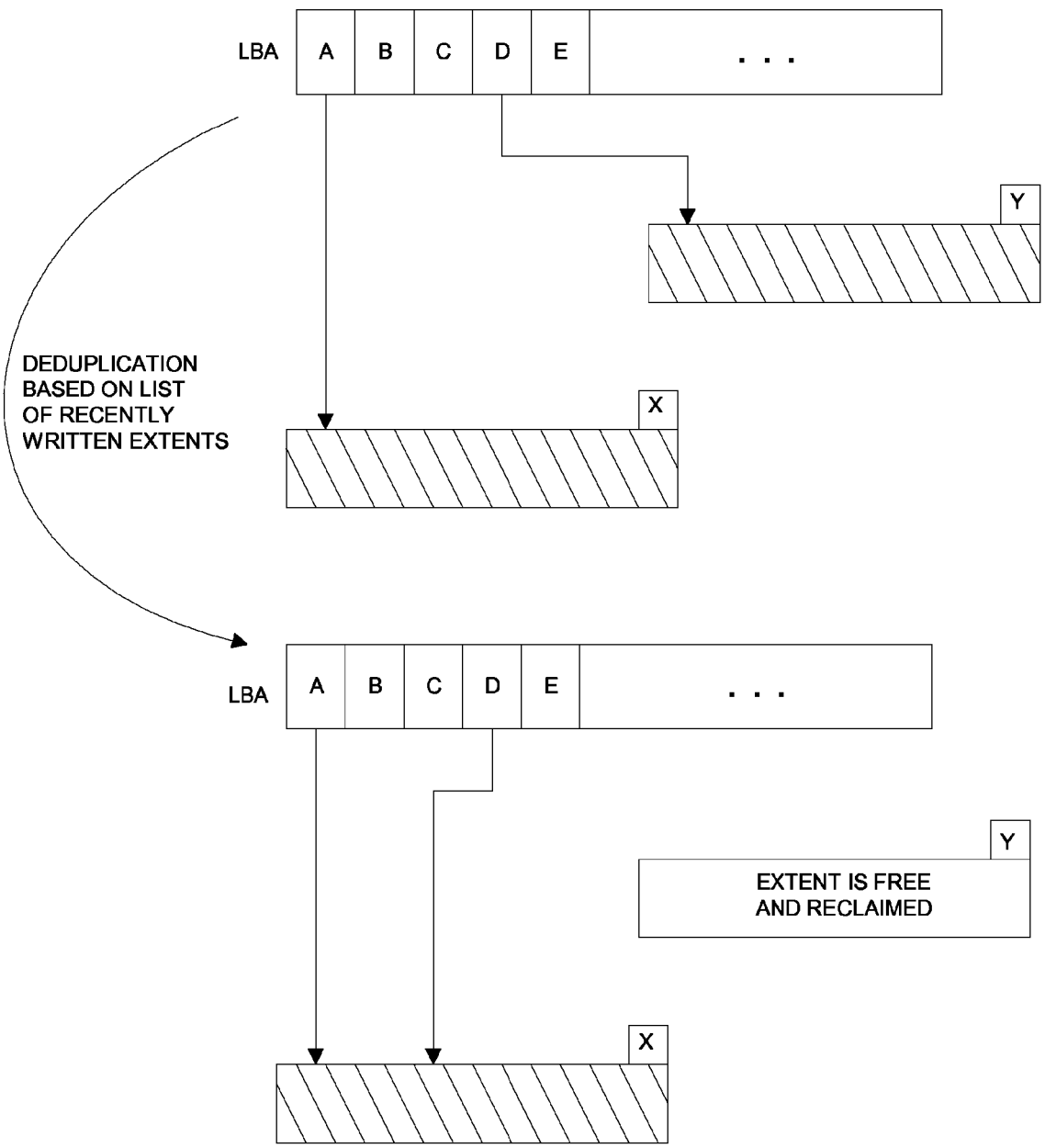
FIG. 7 is a block diagram illustrating aspects of the deduplication process of FIG. 6.

FIGS. 4 through 7 show particular details of the deduplication process. In particular, FIG. 4 shows an example list 42 of recently written extents 38 that is constructed by the deduplication module 104 based on querying the lock history module 102 (also see FIG. 3). FIG. 5 shows an example extent sharing index table 160 which is managed by the deduplication module 104 as part of the deduplication process. FIG. 6 is a flowchart of a deduplication procedure 200 which is performed by the processing circuitry 64 (FIG. 2) when operating as the deduplication module 104 (FIG. 3). FIG. 7 shows how deduplication based on the list 42 of recently written extents 38 results in sharing of an extent 38.

With attention directed to FIG. 4, the list 42 of recently written extents 38 identifies extents 38 which recently received write range-locks as imposed by the range lock module 100, and tracked by the lock history module 102. Such a list 42 is capable of being constructed by filtering and tabulating the range-lock information 44 obtained from the lock history module 102 (FIG. 2).

By way of example, list 42 includes entries 140 which correspond to respective extents 38. Each entry 140 includes a logical extent identifier field 150, a time stamp field 152, a count field 154, and other fields 156. The logical extent identifier field 150 is constructed and arranged to hold the logical extent identifier of a particular extent 38 (e.g., a logical block address). The time stamp field 152 is constructed and arranged to hold the time stamp of the most recent write to the particular extent 38. The count field 154 is constructed and arranged to hold the number of times the particular extent 38 has been overwritten (i.e., modified) since the last time the deduplication module 104 constructed the list 42 (or within a predefined amount of time). The other fields 156 are constructed and arranged to hold additional data such as the file identifier (or owner) of the particular extent 38, the physical location of the particular extent 38, etc.

As mentioned earlier, the criteria for adding an entry 140 to the list 42 of recently written extents 38 is capable of being set by a policy 124. Over time, a user of the data storage system 24 is able to make adjustments (e.g., tune) to the operation of the deduplication module 104 by changing the policy 124 (e.g., modifying policy settings, adding enhancements to the policy, etc.).

With attention directed to FIG. 5, the extent sharing index table 160 includes entries 162 corresponding to digested extents 38, i.e., extents 38 for which the deduplication module 104 (FIG. 3) has already generated hash values. The deduplication module 104 (FIG. 3) uses the extent sharing index table 160 to find possible matching extents 38 (i.e., as a preliminary matching tool). By way of example, each entry 162 of the extent sharing index table 160 includes a hash value field 164 and a set of key fields 166 to form keys corresponding to a particular extent 38. The set of key fields 166 includes a logical extent identifier field 168, a physical extent identifier field 170, a generation count field 172, and other data fields 174.

The hash value field 164 is constructed and arranged to hold a hash value computed by the deduplication module 104 when applying a hashing algorithm to a particular extent 38. The logical extent identifier field 168 is constructed and arranged to hold a logical identifier of the particular extent 38 (e.g., a logical block address). The physical extent identifier field 170 is constructed and arranged to hold a physical extent identifier of the particular extent 38 (e.g., a block-aligned address in physical memory, a lower level logical block address if multiple levels of abstraction are used, etc.). The generation count field 172 is constructed and arranged to hold a generation count of the particular extent 38 (e.g., a number of times the extent 38 has been written/accessed). The other data fields 174 are constructed and arranged to hold other data such as a time stamp of when the entry 162 was added to the list 160, and so on.

With attention directed to FIG. 6, the deduplication module 104 (also see FIG. 2) performs a procedure 200 of evaluating extents 38 for possible deduplication. In particular, rather than attempt to deduplicate all identical extents 38, the deduplication module 104 ignores recently written extents 38 to avoid iterations of deduplicating and splitting frequently overwritten extents 38. In some arrangements, such operation occurs in the background (i.e., during system idle time, as a low priority process/thread, etc.).

In step 202, the deduplication module 104 constructs a recently written extent list 42 which identifies recently written extents 38 (also see FIG. 4). As mentioned above, the deduplication module 104 is able to access range-lock information 44 from the lock history module 102 in order to create the list 42. Along these lines, the deduplication module 104 filters out non-useful information (e.g., non-write lock data), and builds the list 42 to include various write-based details (FIG. 4).

In step 204, the deduplication module 104 obtains a candidate extent 38 while referencing the list 42 to bypass extents 38 which have been recently written. In particular, the deduplication module 104 has access to a series of extent identifiers identifying candidate extents 38 (e.g., from a table of non-digested extents 38). Here, the deduplication module 104 reads an extent identifier (e.g., an LBA) from the series and determines whether the extent identifier is on the recently written extent list 42. If the extent identifier is not on the recently written extent list 42, the deduplication module 104 considers the extent 38 identified by that extent identifier as the candidate extent 38. If the extent identifier is on the recently written extent list 42 (e.g., the LBA does not match any LBAs of the entries 140 of the list 42, also see FIG. 4), the extent 38 identified by the extent identifier was recently modified and the deduplication module 104 skips over that extent identifier to the next extent identifier in the series and so on until the deduplication module 104 finds an extent identifier that is not on the list 42.

After step 204, with a candidate extent 38 which was not recently modified now under consideration, the deduplication module 104 performs the remaining portion of the procedure 200 to process the candidate extent 38 for possible deduplication.

In step 206, the deduplication module 104 digests the candidate extent 38 to produce a current hash value. That is, the deduplication module 104 applies a hashing algorithm to generate a current hash value which identifies the candidate extent 38 (although uniqueness is not guaranteed).

In step 208, the deduplication module 104 searches the extent sharing index table 160 for an entry 162 having an existing hash value (see the hash value field 164 in FIG. 5) which matches the current hash value. Step 208 then proceeds to step 210.

In step 210, if the deduplication module 104 did not find an entry 162 having an existing hash value which matches the current hash value, step 210 proceeds to step 212. However, if the deduplication module 104 did find an entry 162 having an existing hash value which matches the current hash value, step 210 proceeds to step 214.

In step 212, the deduplication module 104 adds a new entry 162 to the extent sharing index table 160 to represent the candidate extent 38. The deduplication module 104 also updates a table of non-digested extents 38 to indicate that the candidate extent 38 has been digested.

In step 214, if the deduplication module 104 found an entry 162 having an existing hash value which matches the current hash value, the deduplication module 104 searches the recently written extent list 42 to confirm that the extent 38 identified by the entry 162 has not been recently written. Step 214 then proceeds to step 216.

In step 216, if the extent 38 identified by the entry 162 has been recently written, the deduplication module 104 returns to step 208 to search for other matches. In particular, it is possible that multiple entries 162 within the extent sharing index table 160 having existing hash values which match the current hash value since uniqueness is not guaranteed. Accordingly, the deduplication module 104 is constructed and arranged to continue evaluation for a possible match and for possible deduplication. One should also appreciate that, even if the extent 38 identified by the entry 162 is identical to the candidate extent 38, the deduplication module 104 does not further process the extent 38 identified by the entry 162 since it has been recently written thus avoiding the possibility of an inefficient deduplication and split cycle.

Still, in connection with step 216, if the extent 38 identified by the entry 162 has not been recently written, the deduplication module 104 proceeds to step 218. In this situation, neither the extent 38 identified by the entry 162 nor the candidate extent 38 has been recently written.

In step 218, the deduplication module 104 performs a comprehensive compare operation between the extents 38 to determine whether the extents 38 are identical. Such a compare may involve comparing each bit of the candidate extent 38 with a corresponding bit of the extent 38 identified by the entry 162. Step 218 then proceeds to step 220.

In step 220, the deduplication module 104 proceeds to step 208 if the extents 38 are not identical (i.e., the comparison is unsuccessful). However, if the extents 38 are identical (i.e., the comparison is successful), step 220 proceeds to step 222.

In step 222, the deduplication module 104 performs an extent sharing operation to deduplicate the extents 38. This operation involves the updating of deduplication metadata (also see the memory constructs 74 in FIG. 2) so that the block mappings for the extents 38 refer to a single instance.

FIG. 7 shows diagrammatically an example of how the deduplication module 104 ultimately deduplicates multiple block mappings that reference identical host data. Initially, as shown in the upper portion of FIG. 7, block mapping LBA_A identifies a first instance of host data at physical location X, and block mapping LBA_B identifies a second instance of host data at physical location Y.

The deduplication module 104 then performs the procedure 200 (FIG. 6) to determine whether to the block mappings LBA_A and LBA_B are able to share a single instance. In particular, the procedure 200 bases the deduplication decision on the list 42 of recently written extents 38 in order to prevent iterations of duplication and splitting of frequently overwritten extents 38.

As shown in the lower portion of FIG. 7, provided that the instances of host data are identical and the instances have not been recently written, the deduplication module 104 shares a single instance of the host data among the block mappings. That is, the deduplication module 104 adjusts the metadata associated with accessing host data so that block mappings LBA_A and LBA_B both identify the first instance of host data at physical location X. As a result, physical location Y is now free and suitable for other use.

It should be understood that the duplication module 104 is constructed and arranged to cleanup the extent sharing index table 160 (FIG. 5) based on the recently written extent list 42 (FIG. 4). That is, it is possible that the extent sharing index table 160 accumulates stale entries 162 as extents 38 which are identified by the table 160 are modified in real time. Accordingly, the duplication module 104 searches the table 160 for entries 162 that identify extents 38 on the list 42. If the deduplication module 104 finds such an entry 162, the deduplication module deletes the entry 162 from the table 160. As a result, extents 38 which have been recently modified have their availability removed from the table 160. Further details of the lock history module 102 will now be provided with reference to FIGS. 8 through 10.

Lock History Module

Figure 9:
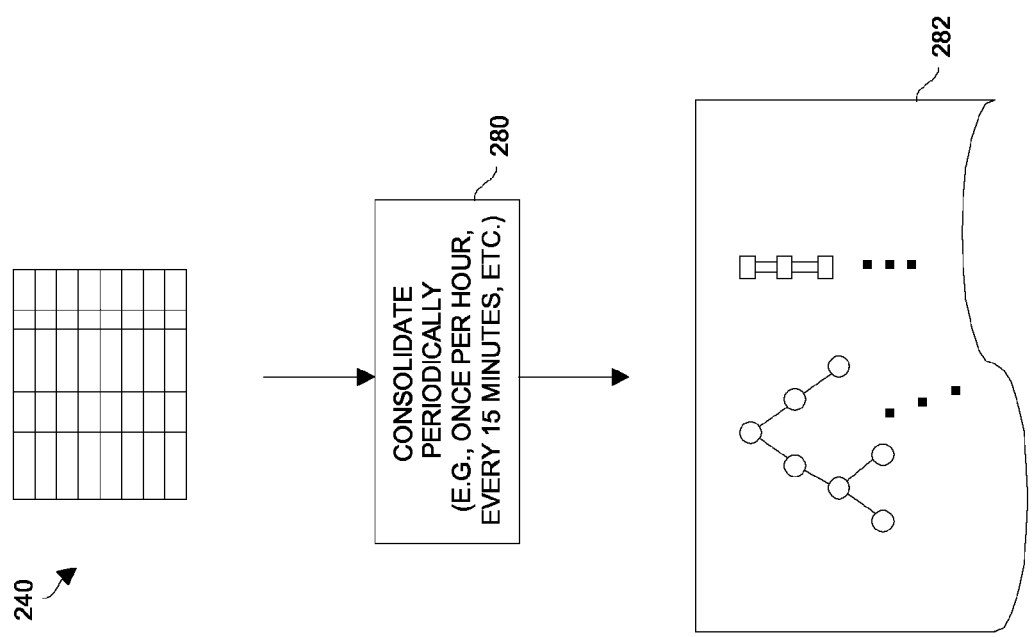
FIG. 9 is a block diagram of a consolidation process which is performed on the lock history database by the data storage apparatus of FIG. 2.
Figure 10:
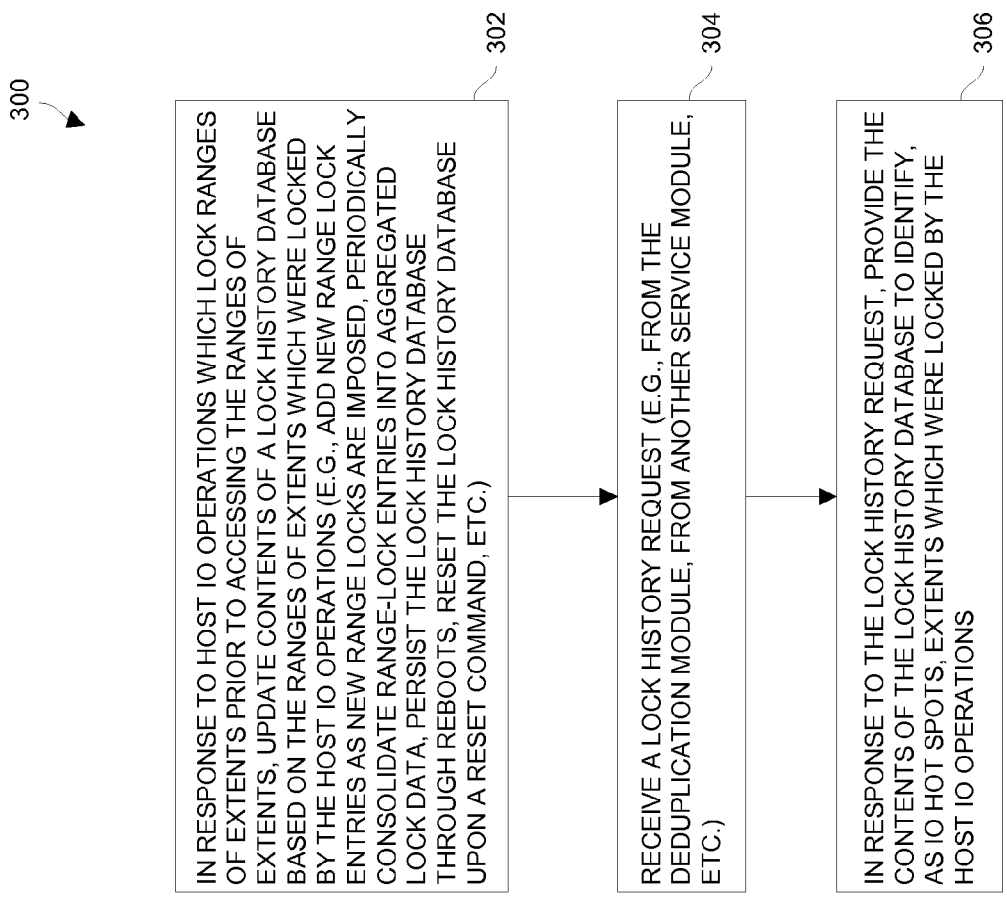
FIG. 10 is a flowchart of a procedure for managing access to the lock history database which is performed by the data storage apparatus of FIG. 2.

FIGS. 8 through 10 show particular details of the lock history module 102. In particular, FIG. 8 shows a set of range-lock entries 240 of the lock history database 46. FIG. 9 shows a consolidation operation which is periodically performed by the lock history module 102 on the set of range-lock entries 240 when managing the range-lock information of the lock history database 46. FIG. 10 shows a flowchart of a procedure 300 which is performed by the lock history module 102.

As shown in FIG. 8, the lock history database 46 includes a set of range-lock entries 240. Each time the lock history module 102 receives an event message 110 informing the lock history module 102 of a new lock 106 imposed on a range of extents 38 from the range lock module 100, the lock history module 102 adds a new range-lock entry 240 in the lock history database 46 to record that lock 106 (also see FIG. 3).

Each range-lock entry 240 includes a lock type field 250, a logical unit identifier (or file ID) field 252, a time stamp field 254, and a set of range fields 256. The fields of each range-lock entry 240 hold range-lock information corresponding to a range lock 106 imposed by the range lock module 100 during a particular host IO operation 32 thus recording the details of that range lock 106. In particular, the lock type field 250 holds a value indicating the type of lock (e.g., a read lock or a write lock) for that range lock 106. The logical unit identifier field 252 holds a logical unit identifier to identify a logical unit for that range lock 106 (i.e., a particular logical unit among multiple logical units maintained for reading and writing by the data storage system 24). The time stamp field 254 holds a time stamp indicating a particular time in which a particular host IO operation 32 locked the range of extents 38. The set of range fields 256 holds range data identifying the particular range of extents 38 which was locked by the particular host IO operation 32.

In some arrangements, the set of range fields 256 includes a starting offset field 258 and a range length field 260. The starting offset field of a range-lock entry 240 holds a starting offset of a particular range lock 106, and the range length field 260 holds the length of that particular range lock 106.

In other arrangements, the set of range fields 256 define range-locks differently. For example, in some arrangements, the set of range fields 256 simply includes a start offset field and an end offset field to hold the starting and ending offsets of a particular range lock 106.

FIG. 9 illustrates a process 280, which is performed by the lock history module 102 (FIG. 3), to consolidate the set of range-lock entries 240 of the lock history database 46 into aggregated lock data 282. Once the set of range-lock entries 240 is consolidated into the aggregated lock data 282, the set of range-lock entries 240 can be deleted from the lock history database 46 to reduce the amount of consumed memory 62. Such a process 280 is capable of being performed routinely (e.g., every hour, every 15 minutes, etc.) as well as manually (e.g., in response to a user command). As a result, the lock history database 46 includes a current set of range-lock entries 240 (i.e., range-lock entries 240 which have not yet been processed), aggregated lock data 282, or both if new range-lock entries 140 have been added since the consolidation process 280 was last performed.

Once a set of range-lock entries 240 has been processed to produce aggregated lock data 282, the aggregated lock data 282 indicates the extents 38 that had been identified by the set of range-locks 106. Accordingly, the aggregated lock data 282 identifies extents which have been recently accessed and which are thus considered active or "hot". Once the aggregated lock data 282 has been formed, future processing of a new set of range-lock entries 240 (i.e., range-lock entries 240 which have been added to the lock history database 46 since the last consolidation process 280) involves adjusting or updating the existing aggregated lock data 282 based on the new set of range-lock entries 240.

In some arrangements, when the lock history module 102 receives a request signal 120 for the contents of the lock history database 46 (FIG. 3), the lock history module 102 performs the consolidation process 280 on any existing range-lock entries 240 to update the aggregated lock data 282. The lock history module 102 then provides, as a response signal 122 (FIG. 3), only the aggregated lock data 282. For example, the response signal 122 may include a file or a pointer to a file containing just the aggregated lock data 282 or a copy of the aggregated lock data 282.

In some arrangements, the aggregated lock data 182 persists until it is cleared (e.g., in response to a user command to reset the values of the lock history database 46). In some arrangements, the lock history database 46 resides in non-volatile storage so that the lock history database 46 persists even during a reboot of the data storage system 24.

In some arrangements, the aggregated lock data 282 includes a mapping table which maps tallied access counts to each extent 38. In other arrangements, the aggregated lock data 282 includes nodes corresponding to time intervals (e.g., one hour ago, two hours ago, etc.) where each node identifies ranges of extents 38 which have been accessed within a particular time interval. Accordingly, the particular structure for the range-lock information in the aggregated lock data 282 may take a variety of forms, e.g., trees, linked lists, counters, combinations thereof, and so on.

One will appreciate that a variety of criteria may be used as a determining factor as to whether each extent 38 is active or inactive. In some arrangements, if the lock history database 46 indicates that an extent 38 was accessed within a predefined amount of time (e.g., an hour, six hours, etc.), the extent 38 is considered active. In other arrangements, if the lock history database 46 indicates that an extent 38 was accessed at least a certain predefined amount of times within a particular amount of time (e.g., at least 3 times within the last 24 hours, etc.), the extent 38 is considered active. Similarly, an extent 38 may be considered inactive if the extent 38 fails to satisfy the active criteria. Further details will now be provided with reference to FIG. 10.

FIG. 10 shows a procedure 300 which is performed by the processing circuitry 64 of the data storage system 24, while operating as the lock history module 102, to identify IO hot spots (also see FIGS. 2 and 3). In step 302, the lock history module 102 updates the contents of the lock history database 46 based on the ranges of extents 38 which were locked by host IO operations 32. In particular, as the range lock module 102 locks ranges of extents 38 as part of the host IO operations 32, the range lock module 102 issues event messages 110 to the lock history module 102 informing the lock history module 102 of the range locks 106 (FIG. 3).

In step 304, the lock history module 102 receives a lock history request. For example, the deduplication module 104 (or another service module) may provide a request signal 120 to the lock history module 102 requesting the contents of the lock history database 46.

In step 306, the lock history module 102 providing the contents of the lock history database 46 to identify, as the IO hot spots, extents 38 which were locked by the host IO operations 38. In particular, the lock history module 102 outputs a response signal 122 back to the requesting deduplication module 104.

Further Details

As described above, an improved technique is directed to managing deduplication based on recently written extents 38. Such operation enables a data storage system 24 to avoid evaluation of frequently overwritten extents 38 and thus save processing and memory resources involved in hash computation, comprehensive block comparisons, and so on. Additionally, such operation provides for a smaller extent sharing index table 160 used for deduplication since the technique is able to eliminate adding table entries 152 corresponding to recently written extents 38. Furthermore, such operation enables quick cleanup of the extent sharing index table 160 by simply deleting any table entries 162 corresponding to recently written extents 38. Accordingly, the technique enjoys lower memory consumption by the extent sharing index table 160 as well as quicker table searching.

While various embodiments of the present disclosure have been particularly shown and described, it will be understood by those skilled in the art that various changes in form and details may be made therein without departing from the spirit and scope of the present disclosure as defined by the appended claims.

For example, it should be understood that the above-described technique for cleaning up the extent sharing index table 160 based on the recently written extent list 42 may be used in combination with a conventional cleanup mechanism.

In some arrangements, cleanup of the extent sharing index table 160 based on the recently written extent list 42 routinely occurs prior to starting a more exhaustive cleanup phase of removing duplicate entries 162 to the same extent 38. In other arrangements, cleanup of the extent sharing index table 160 based on the recently written extent list 42 occurs during certain times of operation (e.g., periods of high IO traffic, during regular business hours, etc.), and a more exhaustive cleanup phase is performed during other times of operation (e.g., periods of low IO traffic, nightly, etc.).

Additionally, it should be understood that some data storage systems may have a standard map for digest procedure which returns a new extent to digest (i.e., from which to compute a hash value). In these situations, the standard map for digest procedure is capable of being enhanced to skip over extents which appear on the recently written extent list 42. That is, the map for digest procedure is modified so as not to return an extent which is recently written thus avoiding further processing of the recently written extent for deduplication purposes. As a result, cycles of deduplicating and splitting frequently overwritten extents are avoided.

In the context of a call back file system (CBFS) using thin provisioning, one should appreciate that the above-described techniques improve deduplication efficiency by utilizing range lock stats from CBFS, generating write hot spot hints, and avoiding deduplication of extents that are most recently written. In short, the CBFS mapping service is able to synchronize data access to mapped LUs by applying IO range locks for different IO types and such information is able to be made available externally through a CBFS API 130 (FIG. 3). In these situations, a deduplication service is able to periodically poll the range lock stats from CBFS, and construct write hot ranges based on the stats data (FIG. 4). When deduplication service performs deduplication operations, it then utilizes the write hot ranges in following ways:

1. The deduplication service skip write hot spots for digest iteration, thus reducing on disk read and digest computing overhead to frequently updated data.
2. The deduplication service drops deduplication sharing requests that involve blocks in the write hot spots, thus reducing on disk read and bit comparison overhead.
3. The deduplication service cleans up deduplication the digest index table using write hot spots as an entry filter, thus reducing the size of the index table and improving lookup efficiency.

By utilizing hot spot information and skipping recently written hot spots, deduplication resources such as index table memory, index persistent storage, and CPU cycles are better utilized. Accordingly, the data storage system enjoys improved deduplication performance with much less resource consumption than conventional systems. In addition, the lock history module 102 captures host application data access patterns, and allow for more intelligent handling with certain user data awareness. Moreover, such techniques are light weight without need to maintain and process stats for cold data. Such modifications and enhancements are intended to belong to various embodiments of the disclosure.

What is claimed is:

1. In a data storage apparatus having processing circuitry and memory which stores extents, a method of managing deduplication of the extents, the method comprising:
    constructing, by the processing circuitry, a recently written extent list which identifies recently written extents stored within the memory;
    referencing the recently written extent list to bypass extents identified by the recently written extent list when obtaining a candidate extent for possible deduplication; and
    processing the candidate extent for possible deduplication;
    wherein the data storage apparatus maintains an extent sharing index table having entries which (i) have existing hash values and (ii) identify extents; and
    wherein processing the candidate extent for possible deduplication includes:
    digesting the candidate extent to produce a current hash value,
    searching the extent sharing index table for an existing entry having an existing hash value which matches the current hash value,
    when an existing entry in the extent sharing index table is found to have an existing hash value which matches the current hash value,
      (i) searching the recently written extent list to confirm that an existing extent, which is identified by the existing entry, is not identified by the recently written extent list,
      (ii) when the existing extent is not identified by the recently written extent list, performing a comprehensive compare operation to determine whether to deduplicate the candidate extent with the existing extent, and
      (iii) when the existing extent is identified by the recently written extent list, adding a new entry to the extent sharing index table, the new entry having the current hash value and identifying the candidate extent, and
    when no existing entry in the extent sharing index table is found to have an existing hash value which matches the current hash value, adding a new entry to the extent sharing index table, the new entry having the current hash value and identifying the candidate extent.

2. A method as in claim 1 wherein the processing circuitry has access to a series of extent identifiers identifying candidate extents; and wherein referencing the recently written extent list to bypass extents identified by the recently written extent list when obtaining the candidate extent for possible deduplication includes:
    outputting, as the candidate extent, a first extent identifier of the series of extent identifiers when the first extent identifier is not on the recently written extent list, and
    skipping over the first extent identifier and outputting, as the candidate extent, a second extent identifier of the series of extent identifiers when (i) the first extent identifier is on the recently written extent list and (ii) the second extent identifier is not on the recently written extent list.

3. A method as in claim 2 wherein performing the comprehensive compare operation to determine whether to deduplicate the candidate extent with the existing extent includes:
    (i) comprehensively comparing the candidate extent with the existing extent, and
    (ii) performing an extent sharing operation between the candidate extent and the existing extent only upon a successful comprehensive comparison.

4. A method as in claim 1, further comprising:
    performing a cleanup operation to reduce the size of the extent sharing index table based on the recently written extent list.

5. A method as in claim 4 wherein performing the cleanup operation to reduce the size of the extent sharing index table based on the recently written extent list includes:
    deleting, from the extent sharing index table, existing entries which identify extents identified by the recently written extent list.

6. In a data storage apparatus having processing circuitry and memory which stores extents, a method of managing deduplication of the extents, the method comprising:

constructing, by the processing circuitry, a recently written extent list which identifies recently written extents stored within the memory;
referencing the recently written extent list to bypass extents identified by the recently written extent list when obtaining a candidate extent for possible deduplication; and
processing the candidate extent for possible deduplication;
wherein constructing the recently written extent list which identifies the recently written extents includes:
from a lock history database which stores a collection of lock information regarding write locks and other locks imposed on the extents stored in the memory, filtering the collection of lock information to ascertain write locked extents satisfying a predefined policy, and building the recently written extent list based only on the ascertained write locked extents satisfying the predefined policy.

7. A method as in claim 6 wherein the lock history database includes lock history records, each lock history record identifying a type of lock imposed on a range of extents; and wherein filtering and building includes:
identifying, as the recently written extents, extents from records of write range locks involving host write operations to ranges of extents, and ignoring records of other types of range locks involving other types of operations on the ranges of extents.

8. A method as in claim 6 wherein the predefined policy identifies a predefined amount of time; and wherein filtering and building the recently written extent list based only on the ascertained write locked extents satisfying the predefined policy includes:
on the recently written extent list, (i) listing extents which were modified within the predefined amount of time and (ii) not listing extents which were not modified within the predefined amount of time.

9. A method as in claim 6 wherein the predefined policy identifies (i) a predefined number of times as a write count, and (ii) a predefined amount of time; and wherein filtering and building the recently written extent list based only on the ascertained write locked extents satisfying the predefined policy includes:
on the recently written extent list, (i) listing extents which were modified at least the predefined number of times within the predefined amount of time and (ii) not listing extents which were not modified at least the predefined number of times within the predefined amount of time.

10. A data storage apparatus, comprising:
a host interface;
memory; and
processing circuitry coupled to the host interface and the memory, the processing circuitry (i) processing host IO operations received through the host interface and (ii) managing deduplication of extents;
wherein the processing circuitry, when managing deduplication of extents, is constructed and arranged to:
construct, in the memory, a recently written extent list which identifies recently written extents stored within the memory,
reference the recently written extent list to bypass extents identified by the recently written extent list when obtaining a candidate extent for possible deduplication, and
process the candidate extent for possible deduplication; and
wherein the processing circuitry maintains an extent sharing index table having entries which (i) have existing hash values and (ii) identify extents; and wherein the processing circuitry, when processing the candidate extent for possible deduplication, is constructed and arranged to:
digest the candidate extent to produce a current hash value,
search the extent sharing index table for an existing entry having an existing hash value which matches the current hash value,
when an existing entry in the extent sharing index table is found to have an existing hash value which matches the current hash value,
(i) search the recently written extent list to confirm that an existing extent, which is identified by the existing entry, is not identified by the recently written extent list,
(ii) when the existing extent is not identified by the recently written extent list, perform a comprehensive compare operation to determine whether to deduplicate the candidate extent with the existing extent, and
(iii) when the existing extent is identified by the recently written extent list, add a new entry to the extent sharing index table, the new entry having the current hash value and identifying the candidate extent, and
when no existing entry in the extent sharing index table is found to have an existing hash value which matches the current hash value, add a new entry to the extent sharing index table, the new entry having the current hash value and identifying the candidate extent.

11. A data storage apparatus as in claim 10 wherein the processing circuitry has access to a series of extent identifiers identifying candidate extents; and wherein the processing circuitry, when referencing the recently written extent list to bypass extents identified by the recently written extent list when obtaining the candidate extent for possible deduplication, is constructed and arranged to:
output, as the candidate extent, a first extent identifier of the series of extent identifiers when the first extent identifier is not on the recently written extent list, and
skip over the first extent identifier and outputting, as the candidate extent, a second extent identifier of the series of extent identifiers when (i) the first extent identifier is on the recently written extent list and (ii) the second extent identifier is not on the recently written extent list.

12. A data storage apparatus as in claim 10 wherein the processing circuitry is further constructed and arranged to:
perform a cleanup operation to reduce the size of the extent sharing index table based on the recently written extent list.

13. A data storage apparatus, comprising:
a host interface;
memory; and
processing circuitry coupled to the host interface and the memory, the processing circuitry (i) processing host IO operations received through the host interface and (ii) managing deduplication of extents;
wherein the processing circuitry, when managing deduplication of extents, is constructed and arranged to:
construct, in the memory, a recently written extent list which identifies recently written extents stored within the memory,
reference the recently written extent list to bypass extents identified by the recently written extent list when obtaining a candidate extent for possible deduplication, and
process the candidate extent for possible deduplication; and
wherein the processing circuitry, when constructing the recently written extent list which identifies the recently written extents, is constructed and arranged to:

from a lock history database which stores a collection of lock information regarding write locks and other locks imposed on the extents stored in the memory, filter the collection of lock information to ascertain write locked extents satisfying a predefined policy, and build the recently written extent list based only on the ascertained write locked extents satisfying the predefined policy.

14. A data storage apparatus as in claim 13 wherein the lock history database includes lock history records, each lock history record identifying a type of lock imposed on a range of extents; and wherein the processin circuitry, when filtering and building, is constructed and arranged to:
identify, as the recently written extents, extents from records of write range locks involving host write operations to ranges of extents, and ignore records of other types of range locks involving other types of operations on the ranges of extents.

15. A data storage apparatus as in claim 13 wherein the predefined policy identifies (i) a predefined number of times as a write count, and (ii) a predefined amount of time; and wherein the processing circuitry, when filtering and building the recently written extent list based only on the ascertained write locked extents satisfying the predefined policy, is constructed and arranged to:
on the recently written extent list, (i) list extents which were modified at least the predefined number of times within the predefined amount of time and (ii) not list extents which were not modified at least the predefined number of times within the predefined amount of time.

16. A computer program product having a non-transitory computer readable medium storing a set of instructions which, when carried out by a computerized device, directs the computerized device to manage deduplication of extents by performing a method comprising:
constructing, by the computerized device, a recently written extent list which identifies recently written extents stored within memory of the computerized device;
referencing the recently written extent list to bypass extents identified by the recently written extent list when obtaining a candidate extent for possible deduplication; and
processing the candidate extent for possible deduplication;
wherein the computerized device maintains an extent sharing index table having entries which (i) have existing hash values and (ii) identify extents; and wherein processing the candidate extent for possible deduplication includes:
digesting the candidate extent to produce a current hash value,
searching the extent sharing index table for an existing entry having an existing hash value which matches the current hash value,
when an existing entry in the extent sharing index table is found to have an existing hash value which matches the current hash value,
(i) searching the recently written extent list to confirm that an existing extent, which is identified by the existing entry, is not identified by the recently written extent list,
(ii) when the existing extent is not identified by the recently written extent list, performing a comprehensive compare operation to determine whether to deduplicate the candidate extent with the existing extent, and
(iii) when the existing extent is identified by the recently written extent list, adding a new entry to the extent sharing index table, the new entry having the current hash value and identifying the candidate extent, and
when no existing entry in the extent sharing index table is found to have an existing hash value which matches the current hash value, adding a new entry to the extent sharing index table, the new entry having the current hash value and identifying the candidate extent.

17. A computer program product as in claim 16 wherein the computerized device has access to a series of extent identifiers identifying candidate extents; and wherein referencing the recently written extent list to bypass extents identified by the recently written extent list when obtaining the candidate extent for possible deduplication includes:
outputting, as the candidate extent, a first extent identifier of the series of extent identifiers when the first extent identifier is not on the recently written extent list, and
skipping over the first extent identifier and outputting, as the candidate extent, a second extent identifier of the series of extent identifiers when (i) the first extent identifier is on the recently written extent list and (ii) the second extent identifier is not on the recently written extent list.

18. A computer program product as in claim 16 wherein the method further comprises:
performing a cleanup operation to reduce the size of the extent sharing index table based on the recently written extent list.

19. A computer program product having a non-transitory computer readable medium storing a set of instructions which, when carried out by a computerized device, directs the computerized device to manage deduplication of extents by performing a method comprising:
constructing, by the computerized device, a recently written extent list which identifies recently written extents stored within memory of the computerized device;
referencing the recently written extent list to bypass extents identified by the recently written extent list when obtaining a candidate extent for possible deduplication; and
processing the candidate extent for possible deduplication;
wherein constructing the recently written extent list which identifies the recently written extents includes:
from a lock history database which stores a collection of lock information regarding write locks and other locks imposed on the extents stored in the memory, filtering the collection of lock information to ascertain write locked extents satisfying a predefined policy, and building the recently written extent list based only on the ascertained write locked extents satisfying the predefined policy.

20. A computer program product as in claim 19 wherein the lock history database includes lock history records, each lock history record identifying a type of lock imposed on a range of extents; and wherein filtering and building includes:
identifying, as the recently written extents, extents from records of write range locks involving host write operations to ranges of extents, and ignoring records of other types of range locks involving other types of operations on the ranges of extents.

21. A computer program product as in claim 19 wherein the predefined policy identifies (i) a predefined number of times as a write count, and (ii) a predefined amount of time; and wherein filtering and building the recently written extent list based only on the ascertained write locked extents satisfying the predefined policy includes:
on the recently written extent list, (i) listing extents which were modified at least the predefined number of times within the predefined amount of time and (ii) not listing extents which were not modified at least the predefined number of times within the predefined amount of time.

* * * * *